United States Patent
Kalman

[11] 3,783,355
[45] Jan. 1, 1974

[54] PLURAL MOTOR DIFFERENTIAL CONTROL MECHANISM

[76] Inventor: Peter Gabor Kalman, 51 Compayne Gdns., London, England

[22] Filed: Oct. 29, 1971

[21] Appl. No.: 193,766

[30] Foreign Application Priority Data
Oct. 30, 1970   Great Britain................... 51,812/70

[52] U.S. Cl........................... 318/8, 318/45, 318/13
[51] Int. Cl.................................................. H02f 5/46
[58] Field of Search........................ 318/8, 45, 13

[56] References Cited
UNITED STATES PATENTS

| | | | |
|---|---|---|---|
| 2,782,515 | 2/1957 | Mayes | 318/8 X |
| 2,613,878 | 10/1952 | Hailey | 318/8 X |
| 2,796,565 | 6/1957 | Walcott, Jr. | 318/8 |
| 2,994,787 | 8/1961 | Fraser | 318/8 X |
| 3,535,607 | 10/1970 | Haslehurst | 318/8 X |
| 3,304,705 | 2/1967 | Rathje et al. | 318/8 X |

Primary Examiner—T. E. Lynch
Attorney—Leo A. Rosetta et al.

[57] ABSTRACT

Mechanism for controlling the rate of movement of a movable body by resolving mechanically the difference between the actual rate of movement of the body and the desired rate of movement as established by a motor driven at a predetermined rate so as to provide a differential movement constituting an error signal. A rotary mechanism has the rotor of a motor connected through high ratio gear to a coupling wheel adapted for rotation by movement of the moving body and the stator of a motor mounted in a housing rotatable relative to a support; the difference between the actual and the desired speed is resolved as movement of the housing relative to the support which actuates a potentiometer to derive a control signal. A linear arrangement is also described, to control the rate of filter forwarding in a plastics filtering apparatus.

14 Claims, 4 Drawing Figures

PLURAL MOTOR DIFFERENTIAL CONTROL MECHANISM

This invention relates to control mechanisms, and more particularly to mechanisms for controlling the rate of movement of a movable body.

In accordance with the invention there is provided a mechanism for controlling the rate of movement of a moving body including a motor having first and second motor members capable of relative movement at a predetermined rate upon energisation of the motor, a coupling member engageable with said moving body for movement therewith and drivingly connected to said first motor member, and a support for the motor, the second motor member being movably mounted in relation to said support, the arrangement being such that, in use, with said coupling member engaged for movement with said moving body and said motor energized to effect said relative movement of said two motor members at said predetermined rate, a difference between the rate of movement of said first motor member through the driving connection with said coupling member and the said predetermined rate of relative movement of the two motor members will be resolved as a differential relative movement between the second motor member and the support.

It will be appreciated that the differential relative movement between the second motor member and the support constitutes an error signal whereby the rate of movement of the movable body can be controlled. Thus, by means of the control mechanism of the invention full control of the rate of movement of the movable body can be obtained in dependence on the predetermined rate of relative movement of the first and second motor members. The relative movement of the motor members is dependent on the type and characteristics of the motor utilised, and upon the nature of the energisation thereof, and it is by suitable selection of these variables that the rate of relative movement of the motor members can be predetermined.

For resolving the difference between the rate of movement of the first motor member through the driving connection with said coupling member and the predetermined rate of relative movement of the two motor members, it is most convenient to arrange that the driving connection between the coupling member and the first motor member is such as to prevent the movement of the coupling member from affecting the predetermined relative movement of the two motor members but to permit the two motor members to be driven together relative to the motor support. The simplest way of achieving this is to provide a high ratio gear train between the first motor member and the coupling member; this effectively isolates the predetermined relative movement of the two motor members from the effects of drive transmitted to the motor from the coupling member, and enables a low power motor to be used.

The motor may, for example, be a linear acting motor such as hydraulic piston and cylinder motor (where the first and second motor members comprise the piston and cylinder), or in some cases an alternately acting double hydraulic piston and cylinder motor. Alternatively, the motor may comprise a rotary motor such as a rotary electric motor.

The use of a single action linear motor is restricted by the limited extent of the stroke of such a motor since continuous control of the rate of movement of a moving body can only be effected so long as the motor movement is continuous. However, intermittent control (i.e. with no control during the return stroke of the motor) is possible using a single action linear acting motor, and such intermittent control may be useful where the controlled rate of movement varies only relatively slowly so that control is not lost significantly during the return stroke of the motor. The use of a double-action linear motor with each half controlling intermittently and alternately so that continuous control results, enables this disadvantage to be overcome and only requires a suitable coupling and uncoupling of the coupling member with the moving body being controlled.

Where a linear acting motor is used, such as a hydraulic motor, the coupling member may be integral with or form an extension of the movable motor part adapted at one end for engagement with the movable body. The coupling member may thus include a portion adapted for engaging and disengaging the movable body and an actuating arrangement therefor so as to permit control of the movable body during movement thereof beyond the extent of a single stroke of the motor.

Whether linear acting motors or rotary motors are used, the arrangement may be "rotary moving" by which is meant that the arrangement is such as to provide rotary movement of the first and second motor members relative to the support and such that the first motor member is drivingly connected to rotate a coupling member disposed in use for rotation with the movable body. Thus, where an electric rotary motor is used, the first motor member may be constituted by the rotor, and the second motor member by the stator.

Alternatively, a "rotary" arrangement can be provided by utilising a solenoid-operated stepping motor, in which a solenoid (constituting the second motor member) mounted so as to be rotatable with respect to the support, moves a plunger to rotate a ratchet wheel (constituting the first motor member) drivingly connected to the coupling member, the plunger being actuated and the ratchet wheel rotated at a rate dependent on the frequency of pulses applied to the solenoid.

In operation of the "rotary moving" arrangements mentioned above and upon energisation of the motor to drive the two motor members at a predetermined rate, the first motor member will try to drive the coupling member. However, if the movable body is not at that time moving at the same speed as the first motor member is trying to move the coupling member, or indeed is not moving at all, then the second motor member will rotate relative to the support in a manner such as to resolve the difference between the rate of movement of the first motor member through the driving connection with the coupling member and the predetermined rate at which the motor is driven. This relative movement of the second motor member and the support will operate the means for controlling movement of the movable body, whereby movement of the body will result such as to allow the coupling member to move to the extent necessary to rotate the second motor member relative to the support to relative positions such that the desired rate of movement of the movable body is approximated.

Where the mechanism according to the invention includes a rotary electric motor, the motor may be a synchronous motor, and may be powered from an adjustable frequency input circuit whereby the intended speed of the motor and hence the desired rate of movement of the movable body can be adjusted.

For controlling the rate of movement of the moving body, it is generally necessary to convert the error signal constituted by the differential relative movement between the second motor member and the support into an electrical signal. This can be done in any convenient manner such as for example by means of a potentiometer having its resistance portion coupled to the second motor member for movement therewith and its wiper connected to the support for movement therewith (or vice versa). To extend the effective operating range of the potentiometer, reduction gearing may be employed to couple the differential relative movement between the second motor member and the support to the potentiometer and also, in the case of a "rotary moving" arrangement, a multi-turn helical potentiometer may be used. In the "rotary moving" arrangements hereinbefore described the motor and potentiometer may be mounted within a common cylindrical housing mounted for rotation with respect to the support, one end of the housing being mounted upon a shaft operating the potentiometer wiper, and the other end of the housing being mounted within bearings by means of a shaft drivingly connecting the first motor member with the coupling member.

It will be appreciated that where any intended application of the invention envisages the possibility of the second motor member rotating for more than a few turns, slip rings may be required for power supply to the motor.

The coupling member may be adapted for frictional contact with the movable body or may be adapted for positive engagement therewith for example by means of a rack and pinion arrangement.

In order that the invention may be more readily understood embodiments thereof and their use in relation to a particular apparatus will now be described by way of example with reference to the accompanying drawings in which.

Figure 1:
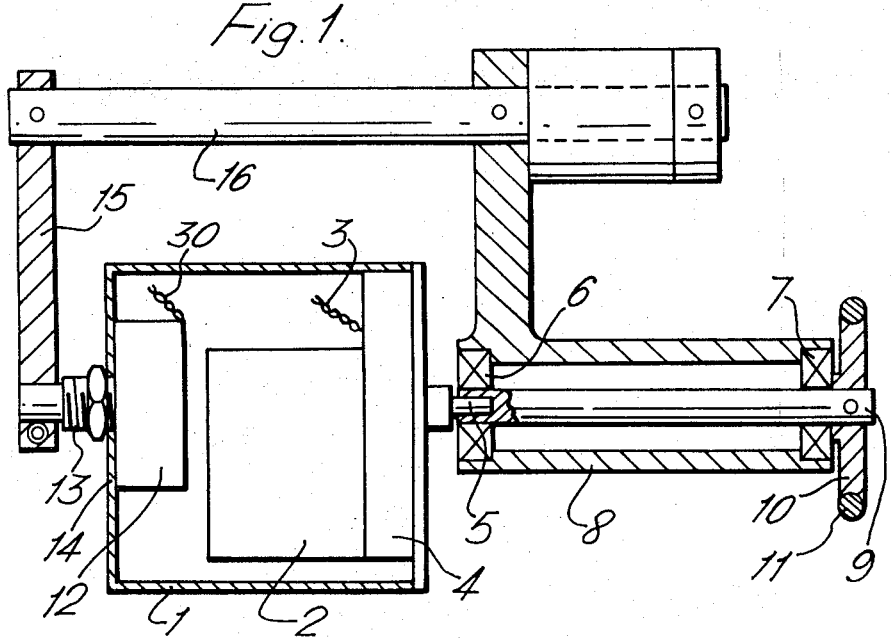
FIG. 1 is a part-sectional side elevation of "rotary moving" embodiment of the control mechanism according to the invention.
Figure 2:
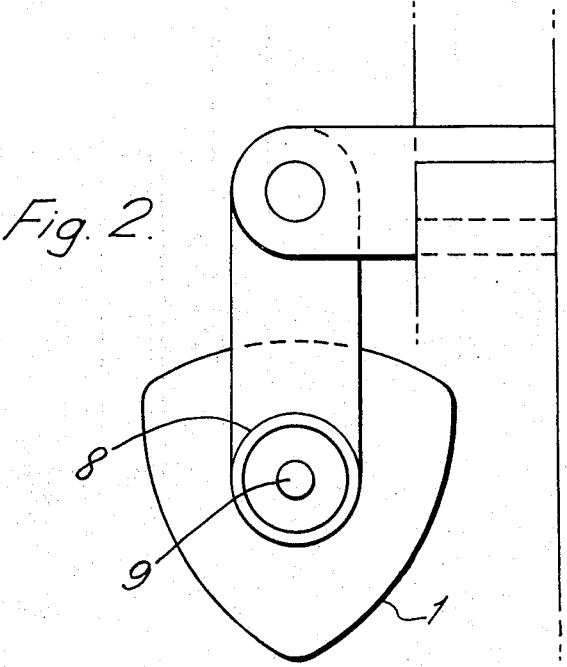
FIG. 2 is an end elevation of the embodiment of FIG. 1.

It will be seen from FIG. 1 that the control mechanism illustrated therein comprises a cylindrical housing 1 enclosing an A.C. synchronous motor 2 which in use is connected to a variable frequency power source (not shown) of any suitable kind by means of leads 3. The motor 2 is mounted upon one end of the cylindrical housing 1 via a gear train arrangement 4. The gear train has an output shaft 5 supported within bearings 6 and 7 in a tubular support member 8. At its free end 9 the shaft 5 carries a coupling wheel 10, which in the embodiment of FIGS. 1 and 2 is provided with a friction tyre 11 of rubber or similar material.

It is to be understood that by this arrangement there is provided a driving connection between the first motor member (in this case the rotor of the motor 2) and the coupling wheel 10 via the gear train 4 and shaft 5. At the same time the shaft 5 and the gear train 4 serve to provide a drive connection from the coupling wheel 10 to produce movement of the second motor member (in this case the stator of the motor 2) and of the housing 1 in relation to which the stator is fixed, relative to the housing support upon any movement of the body to be controlled which is not matched with a corresponding movement of the motor. This is bacause, as is discussed more fully below, the gear train 4 is of such a high ratio as to prevent the coupling wheel rotating the rotor within the stator.

Also mounted within the housing 1 at the end opposite to the gear train 4 is a rotary potentiometer 12. The resistance portion of the potentiometer 12 is mounted fixedly with respect to the housing 1, whereas the potentiometer wiper shaft 13 extends through the end wall 14 of the housing and is fixedly secured to a support arm 15. Hence the potentiometer wiper is fixed relative to the support arm 15.

The support arm 15 and the tubular support 8 are rigidly secured to a support shaft 16, which is adapted to be secured to the apparatus to be controlled by the mechanism illustrated.

Figure 3:
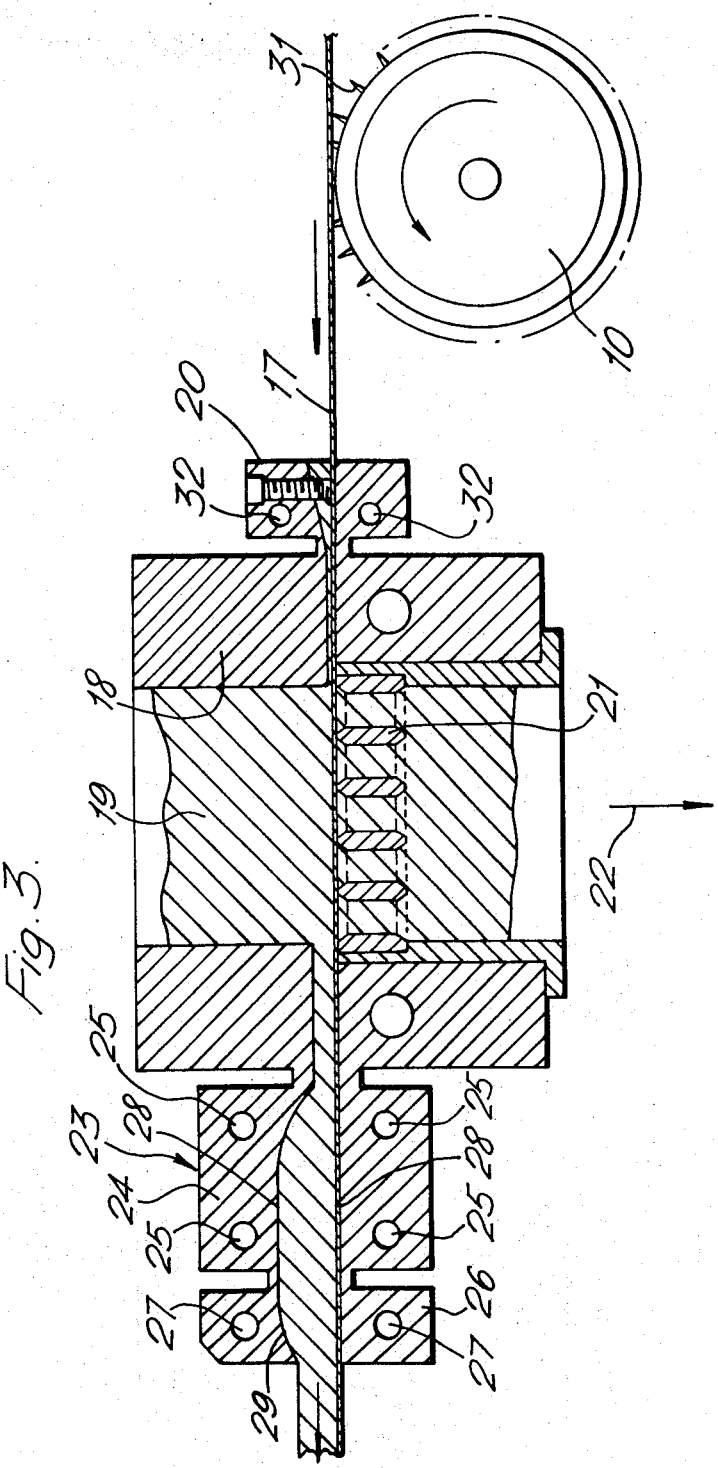
FIG. 3 is a sectional elevation of apparatus to which the control mechanism of FIG. 1 may be applied.

In the particular embodiment described and illustrated in FIG. 3, the apparatus to which the invention is applied comprises filtering apparatus for use in the extrusion of heat softened plastics materials in which a filter band or ribbon 17 is moved slowly and transversly through a filtering passage 18 for the heat softened plastics material 19.

Such filtering apparatus is fully described in U.S. Pat. specification No. 3,471,017 and also in British Patent specification No. 1,181,075, and reference may be made to either of these Specifications for a full understanding of the operation of the filtering apparatus. It is to be seen that the filter band or ribbon 17 passes through an inlet port 20, cooled by collant passing through channels 32 so that a sealing plug of solidified plastics material is formed in the port. The filter 17 extends into and through the filtering passage 18 whilst being supported by a breaker plate 21 against the flow of the plastics material 19 in the direction of the arrow 22, and then passes out through an outlet port 23 which also has collant channels 25 for forming a sealing plug of solidified plastics material. As is fully discussed in the above-identified Patent Specifications, advancing movement of the filter 17 through the inlet port 20, passage 18, and outlet port 23 is caused by means of the differential hydrostatic forces exerted on the filter band or ribbon 17 by the solidified plugs of plastics material at the inlet and outlet ports 20, 23.

In the embodiment illustrated in FIG. 3, the inlet port 20 and the outlet port 23 are formed integrally with the walls of the passage 18. The outlet port is in two parts: an inner part 24 which is provided with the collant channels 25, and an outer part 26 which is provided with heating elements 27. In operation, the softened mass of plastics material within the filtering passage 18 flows into the part 24 of the outlet port where, as the result of the cooling action of the collant in the channels 25, it is formed into a solidified plug bonded to the filter band or ribbon 17. However, as the walls of the port 24 are substantially parallel as shown at 28 (although when dealing, for example, with high friction plastics material such as styrene, the walls may possibly have a slight outwardly widening draft angle as well as being coated with a low friction material such as PTFE)

the solidified plug of plastics material is extruded outwardly through the outlet port 23 by the hydrostatic pressure of the mass of softened plastics material 19, moving with it the filter band or ribbon 17. The internal walls within the part 26 of the outlet port 23 neck in as shown at 29 so that the solidified plug of plastics material would be unable to pass beyond the part 26 of the outlet port 23. However the heating elements 27 in the part 26 soften the plug of plastics material so as to permit it to be deformed and pass from the part 26, taking with it the filter band or ribbon 17.

In the embodiment of the invention shown, the heating power of the heating elements 27 is adjustable, and is arranged to be controlled by the output current from leads 30 from the potentiometer 12 via, for example, a controlled rectifier phase control circuit of any suitable type. Clearly, by varying the heating applied by the elements 27, the amount of softening of the solidified plug of plastics material within the part 26 of the outlet port 23 can be varied and thus the speed at which the plastics material and the filter band or ribbon 17 exit from the outlet port 23 can be controlled.

It is to be noted that in FIG. 3 a variation of the coupling wheel is illustrated, in that instead of having a friction tyre, as shown at 11 in FIGS. 1 and 2, the periphery of the wheel 10 is provided with teeth 31 which positively engage the filter band or ribbon 17.

In operation of the apparatus illustrated in FIG. 3, the filter band or ribbon 17 moves through the passage 18 at a slow continuous speed e.g. approximately half an inch per hour. The gear train 4 is provided with a very high gear ratio, e.g. 250,000 ; 1, and the synchronous motor 2 is provided with a current of a preselected frequency such that the wheel 10 is driven at a predetermined and desired peripheral speed corresponding to the desired speed of movement of the filter band or ribbon 17.

If the filter band or ribbon 17 moves at a speed different from the predetermined speed at which the coupling wheel 10 is rotated, the housing 1 will itself rotate in one or other direction depending upon whether the filter 17 is going faster or slower than the desired speed of rotation of the coupling wheel 10. It should be noted that the difference between the desired speed of rotation of the wheel 10 and the actual speed of movement of the filter 17 cannot be taken up by the control wheel 10 altering the rate of rotation of the rotor relative to the stator of the stator of the motor 2, because the high ratio gear arrangement prevents the coupling wheel 10 affecting the rotation of the rotor within the stator.

As the housing 1 rotates, so the setting of the potentiometer 12 changes. This change in the potentiometer setting is arranged to control the operation of the heating elements 27 to increase to decrease (as may be necessary) the heat applied to the part 16 of the outlet port 23. By this means, the degree of softening of the plastics material plug within the part 26 is varied and hence the speed of exit of the plug of material 19, together with the filter ribbon or band 17, can be increased or decreased in accordance with the requirements as dictated by the desired speed of rotation of the wheel 10.

It is to be noted that the embodiment of the invention particularly described hereinabove can be made in a very inexpensive and simple manner, but at the same time can be arranged to provide accurate control of speed of movement. In the particular embodiment described, where the moving body to be controlled i.e.

the filter band or ribbon 17, is moving at a very slow speed, it is quite clear that there will be little rotation of the housing 1 for control purposes. Where bodies moving at greater speed require to be controlled, accuracy of control can be provided by having a gear arrangement with a lower gear ratio and/or by providing a potentiometer having a helical resistance member fixed relative to the housing 1 to enable more than one revolution of the housing relative to the support during its controlling movement.

Variations of the manner of control of movement of the filter band or ribbon can be made within the scope of the invention. Thus, for example, in a variation of the filtering apparatus the potentiometer 12 could be replaced by a switch arranged to control the operation in sequence of the supply of coolant to coolant channels and the supply of power to electrical heating elements of an outlet port of the apparatus or a valve arranged to control the flow of coolant to coolant channels of an outlet port. Alternatively, a switch could control hydraulic power means arranged physically to move the filter band or ribbon through the filtering passage of the apparatus.

Again, discontinuous movement of the filter band or ribbon through the filtering passage could be attained by connecting the potentiometer to heating elements of an outlet port via a timing arrangement, for example a relaxation oscillator, in which either the "on" or "off" time period for the heating elements is varied by the potentiometer setting as determined by the position of the wiper .

Figure 4:
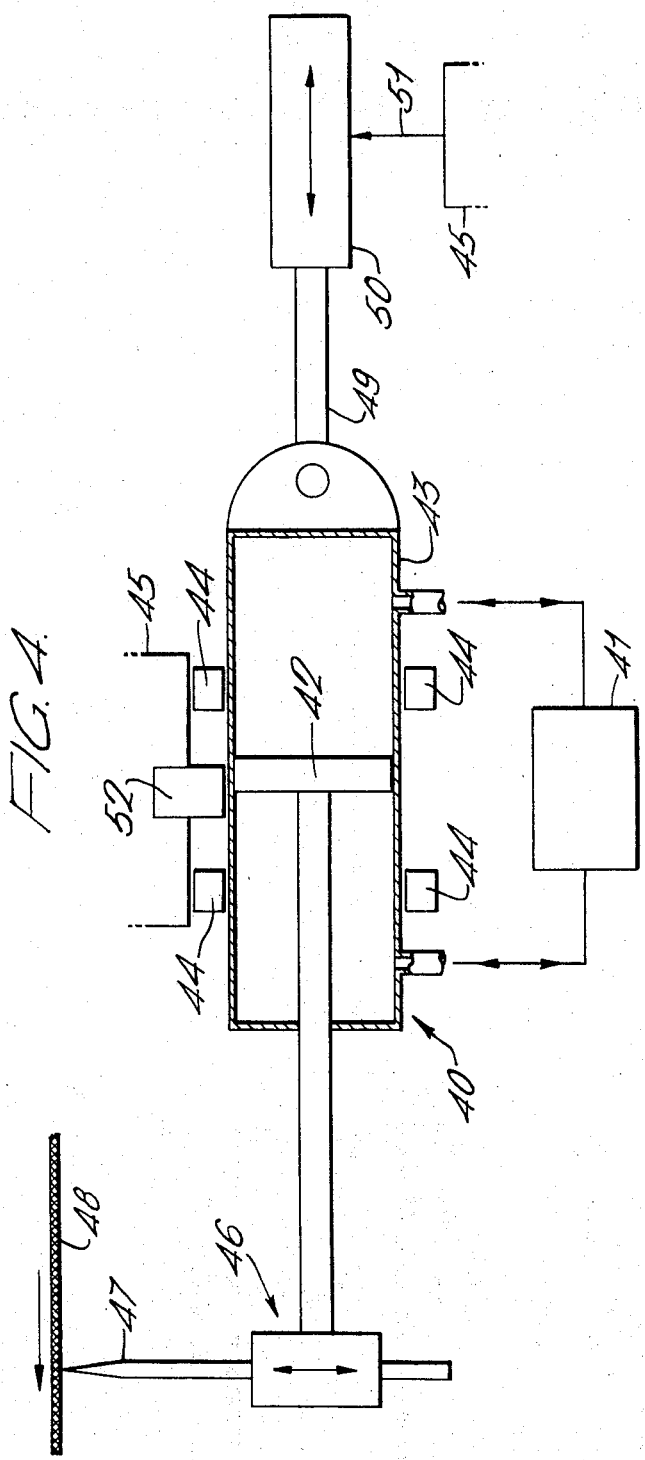
FIG. 4 is a schematic showing of a linearly moving embodiment of the control mechanism according to the invention.

Referring now to FIG. 4 there is schematically illustrated therein a linearly moving embodiment of the invention. In this embodiment, the motor is constituted by hydraulic motor 40 powered from a suitable source 41. The piston 42 constitutes the first motor member and the cylinder 43 constitutes the second motor member, the cylinder 43 being supported in bearings 44 from a support 45 so as to be movable axialy relative to the support 45. The piston 42 is drivingly connected to coupling member 46 constituted in this case by a solenoid-operated needle 47 which is engageable and disengageable with the moving body 48. The cylinder 43 of the hydraulic motor 40 is coupled through connecting link 49 to a linear potentiometer 50 the wiper 51 of which is fixed relative to the support 45. A controllable locking device 52 (e.g. a solenoid-operated brake) is provided for locking the cylinder 43 relative to the support 45 during the return stroke of the motor 40.

In operation of the embodiment of FIG. 4, control of the movement of moving body 48 is intermittent being exercised only during forward movements of the motor and not during the return stroke. As has previously been mentioned, this need not prove disadvantageous so long as the speed of moving body 48 varies at a frequency substantially slower than the frequency of the motor cycling. During the forward stroke of the motor 40, the needle 47 will be engaged with the moving body 48 and the brake 52 will be released; under these circumstances, any difference between the speed of the body 48 as transmitted to the piston 42 and the predetermined relative movement between piston 42 and cylinder 43 as established by appropriately energising the motor 40, will be resolved as a differential relative movement of the cylinder 43 with respect to the support 45. Such differential movement of the cylinder 43 causes the potentiometer 50 to be adjusted, and this can be used to control the movement of the body 48. When the piston 42 has reached the limit of its stroke, the needle 47 is disengaged and the brake 52 simultaneously applied and the piston 42 can then be returned without altering the setting of potentiometer 50. It will be appreciated that the return stroke of the piston 42 during which no control is effected can take place considerably more quickly than the forward stroke during which control is being effected; for example, in the arrangement of FIG. 3 a filter movement of the order of half an inch per hour was quoted, so that with a piston stroke of say six inches continuous control could be effected for a maximum of 12 hours which can be contrasted with a matter of seconds required for the piston return stroke. In such circumstances the return stroke of the piston has a negligible effect upon the control.

If absolutely continuous control should be required, this can be achieved using linearly moving embodiments of the invention by employing a tandem arrangement of two such mechanisms as are shown in FIG. 4 and operating the mechanisms alternately so that each controls during the no-control return stroke of the other.

What I claim is:

1. In a mechanism for sensing the rate of movement of a moving body: a motor having first and second motor members movable relative to each other at a predetermined rate upon energization of the motor, a coupling member engageable with said moving body for movement therewith and drivingly connected to said first motor member, a support for the motor, the second motor member being movably mounted to said support, whereby, with said coupling member engaged for movement with said moving body and said motor energized to effect said relative movement of said two motor members at said predetermined rate, a difference between the rate of movement of said first motor member through the driving connection with said coupling member and the said predetermined rate of relative movement of the two motor members will cause relative movement between the second motor member and the support which movement is a measure of error in the rate of movement of said moving body.

2. A mechanism as claimed in claim 1 wherein, the driving connection between the coupling member and the first motor member is such as to prevent the movement of the coupling member from affecting the predetermined relative movement of the two motor members but to permit the two motor members to be driven together relative to the support.

3. A mechanism as claimed in claim 2 wherein high ratio gearing is provided for coupling the first motor member to the coupling member.

4. A mechanism as claimed in claim 1 arranged to provide rotary movement of the first and second motor members relative to the support and each other and such that the first motor member is drivingly connected for rotation with a coupling member adapted to be rotated by the moving body.

5. A mechanism as claimed in claim 1 wherein the motor includes a linearly acting prime mover and means to convert the linear motor action into a rotary action.

6. A mechanism as claimed in claim 5 wherein the prime mover is a solenoid operable to reciprocate a plunger, and a rotary ratchet wheel is arranged to be rotated by successive reciprocations of said plunger.

7. A mechanism as claimed in claim 4 wherein the motor is a rotary electric motor.

8. A mechanism as claimed in claim 7 wherein the first motor member is constituted by the rotor of the electric motor, the second motor member is constituted by the stator of the electric motor, and the stator is mounted in a generally cylindrical housing supported for rotation relative to the support.

9. A mechanism as claimed in claim 8 wherein a rotary potentiometer is mounted in said housing and the wiper of the potentiometer is fixed to be operated by rotation of the housing relative to the support.

10. A mechanism as claimed in claim 9 wherein reduction gearing is provided between the potentiometer and the housing so as to increase the effective range of the potentiometer.

11. A mechanism as claimed claim 1 arranged to provide rectilinear movement of the first and second motor members relative to the support and wherein the first motor member is drivingly connected for linear movement with a coupling member adapted to be moved rectilinearly by the moving body and capable of engagement and disengagement therewith.

12. A mechanism as claimed in claim 11 wherein the motor is a hydraulic motor having a piston which constitutes having a first motor member and the cylinder which constitutes the second motor member, the cylinder being movably mounted relative to said support and brake means being provided for fixing the cylinder relative to the support during a return stroke of the piston.

13. A mechanism as claimed in claim 11 wherein a rectilinearly extending potentiometer is connected to the cylinder of the motor so as to be adjusted by relative movement between the cylinder and the support.

14. A mechanism as claimed in claim 11 wherein the motor is a double action linear motor having two alternately-operable first motor members each drivingly connected to a separate coupling member, the two coupling members also being alternately operable.

* * * * *